C. VANGOLD.
NON-SKID ATTACHMENT FOR PLOWS.
APPLICATION FILED DEC. 15, 1915.
1,197,081.
Patented Sept. 5, 1916.
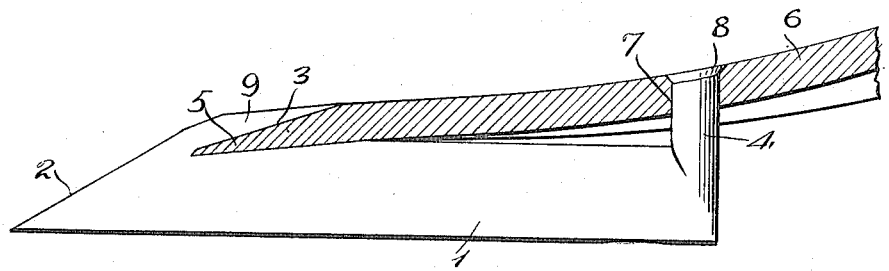
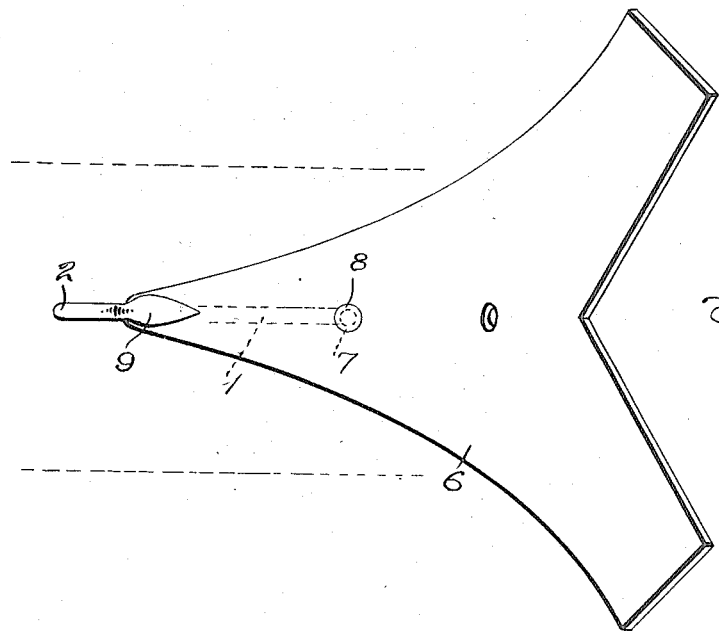
INVENTOR
Constan Vangold.
WITNESSES
Edw. S. Hall.
Lloyd W. Patch
BY Richard Bowen.
ATTORNEY

UNITED STATES PATENT OFFICE.

CONSTAN VANGOLD, OF ALEXANDRIA, LOUISIANA.

NON-SKID ATTACHMENT FOR PLOWS.

1,197,081.  Specification of Letters Patent.  Patented Sept. 5, 1916.

Application filed December 15, 1915. Serial No. 67,017.

*To all whom it may concern:*

Be it known that I, CONSTAN VANGOLD, a citizen of the United States, residing at Alexandria, in the parish of Rapides and State of Louisiana, have invented certain new and useful Improvements in Non-Skid Attachments for Plows, of which the following is a specification.

An object of my invention is to provide an attachment which may be fitted to a point of a middle-breaker or shovel plow, and which will project from the plow share to direct the plow in a straight course while at the same time presenting a fin-like projection extending in line with the path of movement of the plow beneath the point to cut into firm earth below the furrow, thus holding the share against skidding and at the same time guiding the plow to follow the line started by the projecting end of the attachment.

A further object is to so construct and arrange the portions of the attachment to be connected with the plow that it may be fitted to various forms of shares to permit use upon middle-breakers, shovel plows, sweeps, potato diggers, and even upon certain of the shovels of a walking cultivator, to direct the course taken by the share and to insure that a straight furrow will be run, the one essential feature being that the plow or cultivating share shall have a countersunk opening located at a definite position relative to the point of the blade, or shall be arranged to permit the formation of such an opening.

With other objects in view, my invention consists in certain novel features of construction and arrangements of parts which will be hereinafter set forth in connection with the drawings and then pointed out in the claims.

In the drawings: Figure 1 is a sectional view through the point of a plow share with the attachment in place thereon. Fig. 2 is a top plan view of a plow share with the attachment secured in place.

The attachment comprises the body 1 which has the forward end thereof cut across diagonally to form the cutting point 2. A portion of the metal of the body portion adjacent the end 2 is cut or sawed across and raised from the main body of the material to provide the share receiving notch 3, and at the rear end of the body portion 1 an upstanding lug 4 is provided.

In fitting the attachment to the plow share, the point or forward end 5 of the share 6 is fitted within the notch 3, an opening 7 is bored or otherwise formed through the body of the plow share back of and in line with the point 5 thereof and the lug 4 is received through this opening 7. This opening 7 is countersunk as at 8 and the upper end of the lug 4 is headed over into this countersunk portion to secure the attachment in place and to yet present a smooth surface on the upper face of the plow share, after which the clamping portion 9 of the attachment which is formed adjacent the notch 3 is bent down against the point 5 of the share to mount the attachment rigidly in place at the forward end, and if desired the attachment might be welded or otherwise rigidly and permanently fixed on the point 5 of the share 6.

It is preferable that the clamp portion 9 of the attachment be widened out and gradually tapered as is better illustrated in Fig. 2, and as is also shown in this figure, the attachment is made of a thin or rib-like strip, thus insuring that the attachment will cut into the firm earth below the depth to which the furrow is to be sunk and by traveling in a continuous line in the direction of its longitudinal extent will hold the plow share against displacement as it may strike weeds or grass roots or may encounter streaks of earth of a more refractory nature.

From the foregoing it will be seen that I have provided an attachment which may be fitted to the share of a plow, digger, or cultivator, and which will present a penetrating point projecting before the point of the share to guide the course in which a walking agricultural implement of the type described is to move, and which attachment is continued rearwardly beneath the point of the share in a fin or rib extending below the extreme depth of projection of the share and thus acting in the firm earth below the depth to which the furrow is to be cut to hold the course of travel taken by the projecting pointed end.

While I have herein shown and described only one specific form of the invention and have illustrated the device applied only to the share of a middle-breaker or shovel plow, it will be understood that variations may be resorted to in the construction and manner of application and hence I do not wish to be limited except for such limitations as the claims may import.

I claim:

1. An attachment for plows comprising a rib like body provided with a notch adjacent to one end thereof and having an upstanding lug formed at the opposite end of the body and on the side having the notch therein.

2. An attachment for plows comprising a thin strip of material pointed at one end and provided with a notch in the upper edge adjacent to the pointed end, and an upstanding lug formed at the opposite end of the body.

3. An attachment for plows comprising a long thin strip of material pointed at one end and cut and expanded at a point adjacent to this pointed cutting end on the upper edge to form a notch, and an upstanding lug formed at the remaining end of the strip.

In testimony whereof I affix my signature in presence of two witnesses.

CONSTAN VANGOLD.

Witnesses:
S. B. PRESSBURG,
R. C. CULPEPPER.

Copies of this patent may be obtained for five cents each, by addressing the "Commissioner of Patents, Washington, D. C."